United States Patent [19]

Puckett

[11] Patent Number: 4,819,735

[45] Date of Patent: Apr. 11, 1989

[54] HAND-OPERATED LAWN AERATOR

[76] Inventor: Donald L. Puckett, 1220 Custer Ave., Billings, Mont. 59102

[21] Appl. No.: 165,590

[22] Filed: Mar. 8, 1988

[51] Int. Cl.⁴ .................. A01B 1/24; A01B 45/02
[52] U.S. Cl. ...................................... 172/22; 294/50.7
[58] Field of Search ............. 294/50.7, 50, 50.5; 172/22, 21, 25, 19; 111/4

[56] References Cited

U.S. PATENT DOCUMENTS

| | | | |
|---|---|---|---|
| 554,139 | 2/1896 | Ober | 294/50.7 X |
| 1,692,436 | 11/1928 | Deane | 172/22 |
| 1,783,026 | 11/1930 | Ober | 172/22 |
| 1,939,897 | 12/1933 | Hill | 172/22 |
| 3,123,391 | 3/1964 | Novak | 172/22 X |
| 3,210,112 | 10/1965 | Glynn | 172/22 |
| 4,585,072 | 4/1986 | Martinez | 172/22 |

FOREIGN PATENT DOCUMENTS 296139 8/1928 United Kingdom .............. 294/50.7

Primary Examiner—Richard J. Johnson

[57] ABSTRACT

A hand-operated lawn aerator which can be used to extract plugs of thatch and soil from a lawn. The device includes a long hollow tubular member having a cutting head at one end. The hollow tubular cutting head is driven into the ground with an operator's foot by placing weight on a foot support attached to the cutting head. A plunger disc attached to a rod within the tubular head is used to eject the thatch or core of earth from the interior of the cutting head when the cutting head is lifted from the ground. A first supple washer is provided on the plunger disc to move with the plunger disc to wipe against the inside of the hollow cutting head to wipe the inside surface clean. A second supple washer is fixedly positioned inside the tubular body and is positioned to seal the interior of the tubular body from mud and moisture when the cutting tool is used to cut a plug of soil. Inside the tubular body and above the second supple washser is a spring attached to the plunger rod to normally bias the plunger rod in an upward position.

6 Claims, 2 Drawing Sheets

HAND-OPERATED LAWN AERATOR

BACKGROUND OF THE INVENTION

The present invention relates to a portable hand-operated lawn aerator and more particularly to a device for extracting a plug approximately three inches long and onehalf inch in diameter from a lawn.

There are several hand-operated lawn aerators now known in the art. Once such device is shown in U.S. Pat. No. 3,210,112 to Glynn. This patent shows a hollow tubular cutting head attached to an upwardly extending handle. When the cutting head is forced into the ground, a plug of earth and thatch is forced into the tubular cutting head. The handle is hollow and encloses a spring which resiliently acts on a plunger element. When the plunger is driven downwardly, the plunger element forces the plug of earth from the tubular cutting head. The spring and associated members are provided to bias the plunger in the upward direction. Once the plunger is extended to extract the plug from the tubular cutting head and the plunger released, the spring moves the plunger to its upward, normally-resting position. As shown in this patent, the plunger element has a small cross-sectional area relative to the inside cross-sectional area of the tubular cutting head. In wet soil the small cross-sectional plunger is generally not as effective in removing a plug of soil as a device which has a plunger element extending across the entire corss-sectional area of the inside open area of the tubular cutting head.

U.S. Pat. No. 4,585,072 to Martinez describes another gardening tool with a plug ejector. This patent also illustrates a tubular cutting head having a handle attached. The plunger element normally rests at the entrance to the cutting head cavity. When the device is shoved into the ground, the plunger is moved upwardly as it rides on the surface of the soil. A handle is attached by a rod element to the plunger. When the device is lifted away from the ground and this handle is forced downwardly, the plug is forced out of the tubular cutting head. This device uses no springs and the plunger rod element is not protected from mud, soil, or moisture.

U.S. Pat. No. 1,692,436 to Deane shows another cutting device having a tubular cutting member with a plunger and spring mechanism located in the tubular cutting member to assist in removing the plug from the cutting head. In this device, the spring is used to bias the plunger in a downward direction. The spring is compressed by the soil when the tubular cutting member is driven into the soil. The tubular cutting member as described is open at the top. In moist soil conditions, the cutting head is subjected to corrosion caused by mud, moisture and soil. In addition, since the cutting head is open at the top, such materials collect on the top side of the plunger which may cause corrosion and render the cutting device inoperable. The spring mechanism is located in an exposed position near the plunger and is also subjected to the corrosive influence of mud and moisture.

From the above, it is recognized that problems associated with known lawn aerators include the failure to protect the spring mechanism, plunger rod, and plunger from moisture and soil which can corrode these parts.

SUMMARY OF THE INVENTION

The present invention relates to a hand-operated lawn aerator which can be used to extract plugs of thatch and soil from a lawn. It includes a hollow tubular cutting head which in a preferred embodiment is approximately three inches long and one-half inch in diameter. The hollow tubular cutting head is driven into the ground with an operator's foot by placing weight on a foot support attached to the cutting head.

The cutting head is hollow and when the head is driven into the ground, a core of earth and thatch is driven into the interior of the cutting head.

A plunger is provided to eject the core from the cutting head when the cutting head is lifted from the ground. The plunger includes a disc-like element attached to the end of a long rod. The rod is positioned inside a long tubular body. A handle is attached to the upper end of this rod.

A first supple and expandable washer is provided on the plunger disc to move with the plunger disc and is sized to wipe against the inside of the hollow cutting head when the plunger moves up and down within the tubular cutting head.

An upper plunger rod guide is fitted onto the long tubular body at the upper end thereof to guide the plunger rod when it is moved upwardly or downwardly. A second plunger rod guide is positioned at the lower end of the tubular body to further support and guide the plunger rod.

A compression spring is positioned within the tubular body in surrounding relation to the plunger rod and between the first and second plunger rod guides. The second guide is prevented from moving downwardly by a detent in the wall of the tubular body.

A second supple and expandable washer is fixedly positioned inside the tubular body surrounding the plunger rod and is sized to slidably engage the plunger rod as it moves upwardly and downwardly to seal the interior of the tubular member and prevent moisture from entering the lower end of the device when in use.

When the plunger is used to eject a core, a vacuum may develop in the space between the fixed supple and expandable washer positioned inside the tubular body and the movable supple and expandable washer attached to the plunger. For this reason, a vent is drilled through the wall of the device into the space between these two washers. This vent allows air to enter the space to eliminate the vacuum.

The upper, fixed supple and expandable washer is provided to prevent mud, moisture or soil from entering the inside of the tubular body and the lower, movable supple and expandable washer prevents mud, moisture and soil from entering the cavity between the washers.

The spring provided inside the tubular body is used to bias the plunger in a normally-up position adjacent the upper end of the cutting head. When the operator pushes the plunger rod downwardly to eject a core, this spring is compressed between the upper and lower plunger rod guides. When the plunger handle is released, the spring retracts the plunger.

The present invention is constructed to minimize fouling which would otherwise occur when moist soil clings to the inside walls of the tubular cutting head. The supple and expandable washer on the plunger clears the inside wall of the tubular cutting head of mud and moisture each time it is moved downwardly. In a preferred embodiment the washer is constructed of leather which can be oiled from time to time to keep the washer in a sealing condition and to provide an oil film on the inside surface of the cutting head for added protection against corrosion.

Further, the present invention provides structure for preventing moisture from entering the tubular body where the spring is located. Thus, the spring mechanism is protected from water or dirt entering the tubular body when the lawn aerator is being used.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
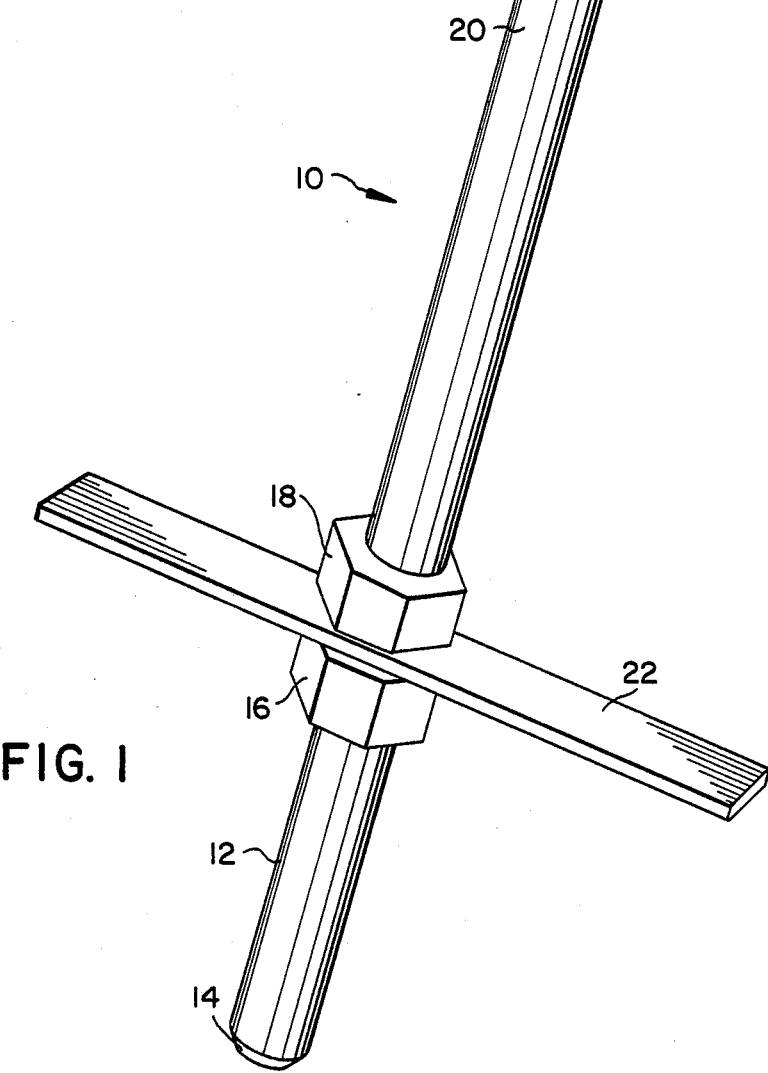
FIG. 1 is an elevational perspective view of the aerator according to the present invention.
Figure 2:
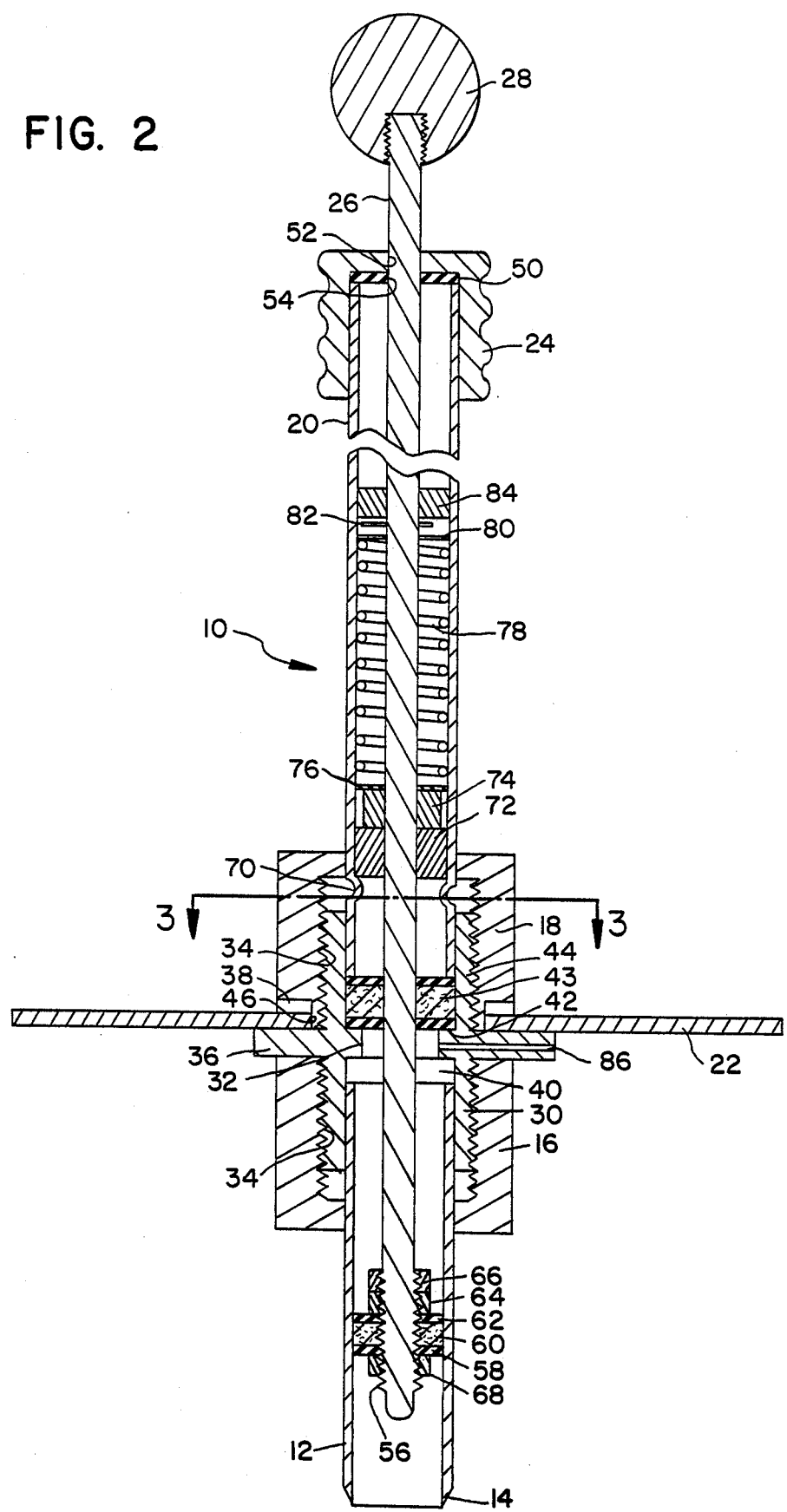
FIG. 2 is a cross-sectional view of the aerator along line 2—2 in FIG. 1.

A hand-operated lawn aerator 10 is shown in FIGS. 1 and 2. The aerator 10 includes a tubular cutting head 12 having a cutting edge 14 located at the bottom thereof as shown in FIGS. 1 and 2. A threaded lower coupling nut 16 and a threaded upper coupling nut 18 are provided for coupling a main tubular body 20 to the tubular cutting head 12 as will be described subsequently. A foot support 22 is positioned between the lower coupling nut 16 and upper coupling nut 18 as shown. A fixed handle 24 is fixedly secured to the upper end of tubular body 20. A plunger rod 26 extends through the fixed handle 24 into the interior of tubular body 20 as shown in FIGS. 1 and 2 and a handle 28 is provided at the upper end of plunger rod 26.

Figure 3:
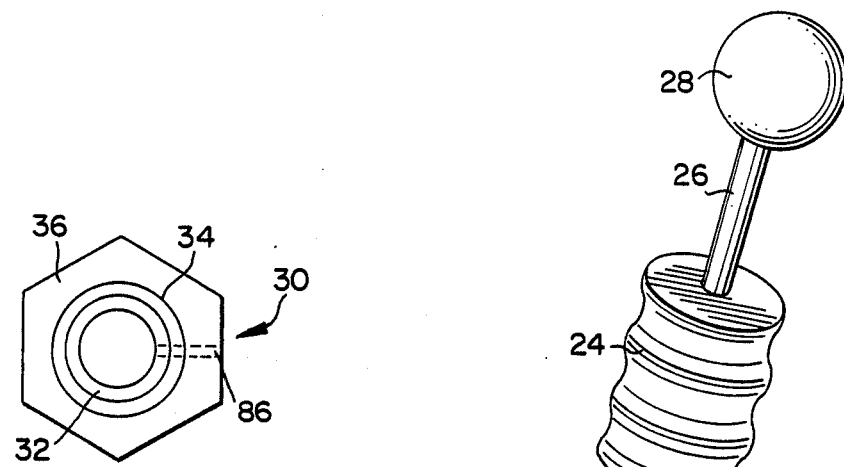
FIG. 3 is a top view of a compression coupler with surrounding parts removed in the direction along line 3—3 in FIG. 2.

As shown in FIG. 2, a tubular compression coupler member 30 is provided for coupling the tubular body 20 to the tubular cutting member 12. This tubular compression coupler 30 has an inwardly extending ridge 32. The upper side of this ridge 32 supports the tubular body 20 and the lower side of this ridge 32 supports the tubular cutting head 12. As shown in FIG. 2, the tubular compression coupler 30 has outer threads 34, the upper portion of which mates with inner threads of the upper coupling nut 18 and the lower portion of which mates with the inner threads of the lower coupling nut 16. As shown in FIGS. 2 and 3, the tubular compression coupler 30 further includes a nut portion 36 formed on the periphery of compression coupler 30 against which the foot support 22 rests as shown in FIG. 2. A washer 38 having a hole sized to fit over the threaded portion of compression coupler 30 is positioned between the foot support 22 and the upper nut 18.

The cutting head 12 is secured in the compression coupler 30 by first inserting a washer 40 within the lower portion of the compression coupler 30 until the washer rests against the ridge 32 of the compression coupler 30. Next, the tubular cutting head 12 is inserted in the lower end of the compression coupler 30 until the upper end of the cutting head 12 rests against the washer 40. Next, the lower coupling nut 16 is threaded on the compression coupler 30 on cutting head 12.

The tubular body 20 is secured to the compression coupler 30 by first inserting washer 42 inside the upper portion of compression coupler 30 until it rests against the upper side of inner ridge 32. Next, a supple and expandable washer 43 is inserted in the compression coupler 30 over the washer 42. In a preferred embodiment, the washer 43 is constructed of leather. Next, an outer washer 44 is placed on top of the supple and expandable washer 43, whereby the washers 42 and 44 sandwich the supple and expandable washer 43 in between. Next, the tubular body 14 is inserted in the upper portion of compression coupler 30 until the lower end thereof rests against the outer washer 44.

The foot support 22 having a central bore 46 is inserted over the upper portion of compression coupler 30. The central bore 46 is sized to receive the threaded upper portion of compression coupler 30. The washer 38, having a central bore sized to receive the upper threaded portion of compression coupler 30, is then placed on top the foot support 22 as shown in FIG. 2.

Finally, the upper coupling nut 18 is threaded on the upper portion of compression coupler 30 and tightened to secure the compression coupler 30 to the main tubular body 20.

A substantially cup-shaped fixed handle 24 is frictionally secured on the outer surface of tubular body 20. A washer 50 is positioned intermediate the upper end of tubular body 20 and the fixed handle 24. The outside diameter of the washer 50 corresponds to the outside diameter of the tubular body 20. The fixed handle 24 has a central hole 52 in the upper end thereof and washer 50 has a central hole 54 for receiving the plunger rod 26. The plunger handle 28 is secured to the plunger rod 26 as by threading.

The lower end of plunger rod 26 as shown in FIG. 2 is positioned inside the tubular cutting head 12. This end of the plunger rod 26 has outside threads 56. A plunger washer 58 is positioned in surrounding relation to the plunger rod 26 and has an outside diameter sized to fit slidably within the interior of the cutting head 12. This plunger washer 58 functions as a plunger disc used to eject the core of earth extracted from the cutting head as will be described. On the upper side of washer 58 is provided a supple and expandable washer 60, preferably constructed of leather, which is sized to wipe against the interior surface of the tubular member 12. A second washer 62 is positioned above the supple and expandable washer 60.

Locking nuts 64 and 66 are threadably mounted on plunger rod 26 prior to positioning washers 58, 60 and 62. A lower locking nut 68 is threaded on plunger rod 26 and tightened to securely hold washers 58, 60 and 62 against locking nut 64. The washers 58 and 62 sandwich the supple and expandable washer 60 between them. Locking nut 68 can be tightened to expand washer 60 to provide for a tighter fit between washer 60 and inside wall of tubular cutting head 12.

The tubular body 20 has an interiorly extending detent 70 positioned in spaced relation to the lower end of body 20 as shown in FIG. 2. A lower guide 72 is provided within the tubular body 20 in surrounding relation to plunger 26 and rests against the upper side of detent 70 as shown. The first guide 72 has an outer diameter sized to abut against the inside wall of tubular body 20 and has a central hole sized to slidably receive the plunger rod 26. The detent 70 prevents the lower first guide 72 from moving to a position below this detent.

Above the lower first guide 72 is provided a spacer washer 74 and above this spacer washer is provided a washer 76 which abuts the lower end of a coiled compression spring 78 mounted on the plunger rod 26 in surrounding relation. Above the spring 78 is positioned an upper washer 80. A hairpin keeper 82 which is inserted in an annular groove provided in the plunger rod 26 prevents the washer 80 from moving upwardly on plunger rod 26.

An upper guide 84 is provided above the hairpin keeper 82. The upper guide 84 and the lower guide 72 guide the plunger rod 26 as it travels upwardly and downwardly through body 20.

The spring 78 is positioned between the upper washer 80 and washer 76. As will be noted, when the plunger rod 26 is forced downwardly with handle 28, the spring 78 compresses between the two washers 76 and 80. When the handle 28 is released, the spring exerts an upward force on the plunger rod 26 with the upper washer 80 acting against the hairpin keeper 82 to move the plunger rod 26 to its normally upward position. The upper limit of travel of the plunger rod 26 is limited by nut 66 on the lower end of plunger rod 26 abutting washer 40 located on top of cutting head 12 in compression coupler 30. When the plunger rod 26 is forced downwardly, the spring 78 is compressed and the travel is stopped by the plunger handle 28 coming to rest against the fixed handle 24.

Since the two supple and expandable washers 43 and 60 fit tightly against the inside wall of compression coupler 30 and cutting head 12 respectively, they create a sealed volume between them. This volume will expand or contract as the plunger rod 26 is extended or retracted. The washers 43 and 60 restrict moisture, mud and soil from entering the upper portion of the tubular cutting head 12 and the tubular body 20 where the spring 78 is located. However, the two washers 43 and 60 act as a seal creating a vacuum in the volume inside the tubular members between these two washers. This vacuum hinders movement of plunger rod 26 and further tends to suck mud and moisture into this volume. To eliminate the problem resulting from the vacuum created when the plunger rod 32 is moved downwardly, a vent 86 is drilled in the nut portion 36 of coupler 70 to vent this vacuum to the atmosphere. By eliminating the vacuum, the tendency to suck mud, moisture and soil into the vacuum area is also eliminated. This overcomes a problem with early embodiments of the present invention where the vacuum eliminator was not used and it was found that mud, moisture and other materials were sucked into this area upon use.

In order to use the device, the user pushes the tubular cutting end 12 into the ground using the foot support 22. This causes a core of earth to be forced into the inside of tubular cutting head 12. The device 10 is then lifted from the ground carrying the core cut by tubular cutting head 12 with it. When the tubular cutting head 12 is lifted off the ground and the plunger rod 26 is forced downwardly with handle 28, the plunger washer 58 forces the core outside the tubular member 12. The supple and expandable washer 60 scrapes the inner wall of tubular member 12 and wipes this surface clean during the ejection of the core from the tubular member 12. Further, in a preferred embodiment, the supple and expandable washer 60 is constructed of leather and can be oiled after use. By oiling the washer 60, it remains resilient and supple even after extended use and continues to provide the beneficial function of wiping the inner surface of the cutting head 12 clean. Further, if the washer 60 is oiled, the washer provides a thin film of oil on the inside wall of tubular cutting head 12 to prevent corrosion of this cutting head under these moist conditions.

While the fundamental novel features of the invention have been shown and described, it should be understood that various substitutions, modifications or variations may be made by those skilled in the art without departing from the spirit or the scope of the invention. Accordingly, all such modifications and variations are included in the scope of the invention as defined by the following claims:

I claim:

1. A hand-operated lawn aerator for extracting a plug of earth from the ground comprising:
   a tubular body having an inside wall;
   a tubular cutting head coaxially secured to the tubular body at a lower end thereof, the cutting head having an inside wall;
   a plunger disc located inside the cutting head;
   a movable plunger rod axially located within the tubular body and having the plunger disc mounted at a lower end thereof;
   a plunger handle mounted at an upper end of the plunger rod;
   a first supple and expandable washer connected to the plunger rod immediately above the plunger disc, the first supple and expandable washer having an outside diameter sized to scrape the inside wall of the cutting head when the plunger disc is moved inside the cutting head;
   a second supple and expandable washer positioned in the tubular body above the cutting head, the second supple and expandable washer having an outside diameter sized to abut the inner wall of the tubular body and further having a centrally located hole therethrough sized to slidably receive the plunger rod; and
   a compression spring positioned within the tubular body above the second resilient washer, the spring being connected between the plunger rod and the tubular body to normally bias the plunger rod to an uppermost position in which position the plunger disc connected to the plunger rod is located adjacent the upper end of the cutting head.

2. The hand-operated lawn aerator according to claim 1 wherein the first and second supple and expandable washers are constructed of material for absorbing a corrosion inhibiting lubricant.

3. The hand-operated lawn aerator according to claim 2 wherein the first and second supple and expandable washers are constructed of leather.

4. The hand-operated lawn aerator according to claim 1 further including means for compressing the first supple and expandable washer to expand the outer diameter of the washer to increase a tight fitting relation between the supple and expandable washer and the inner wall of the cutting head.

5. The hand-operated lawn aerator according to claim 1 further including venting means for venting to the atmosphere a volume defined by the space between the first and second supple and expandable washers and the inside wall of the tubular body and tubular cutting head.

6. The hand-operated lawn aerator according to claim 1 further including a foot support means mounted exteriorly to the tubular body which means is provided to be engaged by a foot of a user for forcing the cutting head into the earth.

* * * * *